United States Patent Office 3,373,200
Patented Mar. 12, 1968

3,373,200
TRIHALOTHIONOACETAMIDES
Lowell R. Smith, St. Louis, and Angelo John Speziale, Creve Coeur, Mo., assignors to Monsanto Company, St. Louis, Mo., a corporation of Delaware
No Drawing. Filed July 22, 1963, Ser. No. 296,427
1 Claim. (Cl. 260—566)

This invention relates to new and useful $\alpha,\alpha,\alpha$-trihalothionoacetamides, to the preparation thereof, and to new and useful precursors for same.

The $\alpha,\alpha,\alpha$-trihalothionoacetamides of this invention can be represented by the formula

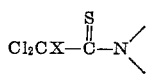

wherein X is chlorine or bromine, but preferably chlorine, and wherein —N< is a secondary amine residue, i.e., (1) A saturated single ring heterocyclic amine residue of the formula

wherein A is a divalent alkylene radical having from 4 to 10 carbon atoms and having from 4 to 6 carbon atoms in a continuous chain between the terminal valence bonds, or (2) A secondary amine residue of the formula

wherein B and D are like or unlike alkyl radicals or aromatic hydrocarbon radicals of the benzene series having up to 10 carbon atoms.

The $\alpha,\alpha,\alpha$-trihalothionoacetamides of this invention are prepared by reacting hydrogen sulfide with an iminium salt which can be represented by the formula

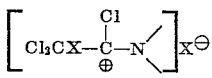

wherein X and —N< have the aforedescribed significance. These iminium salt precursors are new compounds and are prepared by the addition of elemental chlorine or elemental bromine to an equimolecular amount of a 1,2,2-trichlorovinylamine of the formula

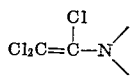

wherein —N< has the aforedescribed significance. These iminium salts are sensitive to water or moisture and therefore it is preferred that they prior to subsequent use be kept in suspension or solution in an inert organic liquid or solvent and/or under a nitrogen atmosphere.

In general in the procedural operations of this invention the 1,2,2-trichlorovinylamine reactant will be dissolved in an inert organic solvent (e.g., carbon tetrachloride, chloroform, methylene chloride, 1,2-dichloroethane, pentane, hexane, heptane, petroleum ether, benzene, toluene, xylene, etc., or various mixtures thereof), which solution is preferably anhydrous and as concentrated as possible, and thereto is added dry chlorine or dry bromine until at least one molar equivalent thereof is absorbed. The iminium salt is then recovered by initially vacuum distilling the volatiles which includes any unreacted halogen followed by solvent extraction and/or recrystallization from an inert organic solvent. While a wide range of reaction temperatures can be employed provided the system is fluid (i.e., maintenance of a temperature above the freezing point of the system up to and including the boiling point of the system) due to the nature of the reactants it is preferred to employ a reaction temperature in the range of from about —20° C. to about +30° C. Pressures above or below atmospheric pressure can be used however in general atmospheric pressure will be satisfactory.

In general in the preparation of the $\alpha,\alpha,\alpha$-trihalothionoacetamides of this invention dry hydrogen sulfide will be added to an anhydrous solution of the iminium salt until at least one molar equivalent thereof is absorbed. Any inert organic liquid can be employed as the solvent medium (e.g., carbon tetrachloride, chloroform, methylene chloride, 1,2-dichloroethane, pentane, hexane, heptane, benzene, toluene, xylene, etc., or mixtures thereof). The $\alpha,\alpha,\alpha$-trihalothionoacetamide so produced is then recovered by any standard method for recovering solids or liquids as the case may be. While a wide range of reaction temperatures can be employed provided the system is fluid (i.e., maintenance of a reaction temperature above the freezing point of the system up to and including the system's boiling point) due to the nature of hydrogen sulfide it is preferred to employ a reaction temperature in the range of from about —20° C. to about +30° C. Pressures above or below atmospheric pressure can be used however in general atmospheric pressure will be satisfactory.

As illustrative of the procedural operations of this invention but not limitative thereof is the following:

EXAMPLE I

To a suitable reaction vessel equipped with a thermometer and agitator is charged a solution of 4.3 parts by weight of N-methyl-N-phenyl-1,2,2-trichlorovinylamine in approximately 80 parts by weight of carbon tetrachloride and the solution cooled to about 0° C. With agitation and while maintaining the temperature in the range of 0 to 10° C. dry chlorine is bubbled beneath the surface of the anhydrous fluid medium until approximately 1.4 parts by weight is absorbed. Thereafter the reaction mass is subjected to vacuum distillation at about 30° C. and 30 mm. of mercury to remove the volatiles. The residual orange oil identified as the iminium salt

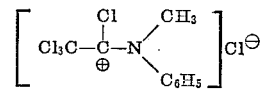

is then dissolved in approximately 70 parts by weight of methylene chloride. With agitation and while maintaining the temperature at about 10° C. hydrogen sulphide is bubbled beneath the surface of the anhydrous fluid medium until approximately 1.5 parts by weight are absorbed (about 30 minutes). The reaction mass is then subjected to vacuum distillation at about 30° C. and 30 mm. of mercury to remove the volatiles. The oily residue is then dissolved in pentane and placed on a column of neutral alumina (Woelm) packed wet with pentane. Elution with hexane at 25° C. gives an orange oil which solidified after standing 48 hours at room temperature. This solid upon recrystallization from hexane gives 3.3 parts by weight of yellow solid N-methyl-N-phenyl-$\alpha,\alpha,\alpha$-trichlorothionoacetamide (M.P. 71–72° C.).

*Analysis.*—Calculated 40.24% C, 3.00% H, 39.60% Cl, 5.22% N. Found: 40.33% C, 3.14% H, 39.59% Cl, 5.22% N.

EXAMPLE II

Employing the procedure of Example I but replacing N-methyl-N-phenyl - 1,2,2 - trichlorovinylamine with an equimolecular amount of N,N-diphenyl - 1,2,2 - trichlorovinylamine there is obtained N,N - diphenyl - $\alpha,\alpha,\alpha$-trichlorothionoacetamide. The iminium salt intermediate is identified as

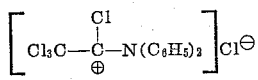

EXAMPLE III

Employing the procedure of Example I but replacing N-methyl - N - phenyl - 1,2,2 - trichlorovinylamine with an equimolecular amount of N-(hexamethylene) - 1,2,2-trichlorovinylamine there is obtained N - ($\alpha,\alpha,\alpha$-trichlorothionoacetyl)-hexamethyleneimine. The intermediary iminium salt is

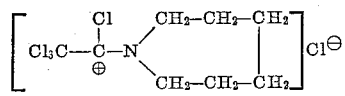

EXAMPLE IV

To a suitable reaction vessel equipped with a thermometer and agitator is charged a solution of 4.8 parts by weight of N,N - diethyl - 1,2,2 - trichlorovinylamine in approximately 65 parts by weight of carbon tetrachloride and the solution cooled to about 0° C. With agitation and while maintaining the temperature at about 0° C. dry chlorine is bubbled beneath the surface of the anhydrous fluid medium until approximately 1.8 parts by weight is absorbed. Thereafter the reaction mass is subjected to vacuum distillation at about 30° C. and 30 mm. of mercury to remove the volatiles. The oily residue identified as the iminium salt

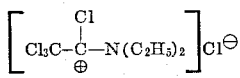

is then dissolved in approximately 55 parts by weight of methylene chloride. With agitation and while maintaining the temperature at about 25° C. hydrogen sulphide is bubbled beneath the surface of the anhydrous fluid medium until approximately 0.9 part by weight are absorbed (about 60 minutes). The reaction mass is then subjected to vacuum distillation at about 30° C. and 30 mm. of mercury to remove the volatiles. The oily residue is then dissolved in pentane and placed on a column of neutral alumina (Woelm) packed wet with pentane. Successive elutions with pentane at 25° C. gives a yellow oil (3.1 parts by weight) identified as N,N-diethyl-$\alpha,\alpha,\alpha$-trichlorothionoacetamide.

*Analysis.*—Calculated 30.72% C, 4.29% H, 45.34% Cl, 5.97% N. Found: 31.01% C, 4.66% H, 46.86% Cl, 5.77% N.

EXAMPLE V

Employing the procedure of Example IV but replacing N,N - diethyl - 1,2,2 - trichlorovinylamine with an equimolecular amount of N,N - dimethyl - 1,2,2 - trichlorovinylamine there is obtained N,N - dimethyl - $\alpha,\alpha,\alpha$-trichlorothionoacetamide. The intermediary iminium salt is

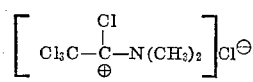

EXAMPLE VI

Employing the procedure of Example I but replacing N-methyl - N - phenyl - 1,2,2 - trichlorovinylamine with an equimolecular amount of N-isopropyl - N - phenyl-1,2,2 - trichlorovinylamine there is obtained N-isopropyl-$\alpha,\alpha,\alpha$-trichlorothionoacetanilide. The intermediary iminium salt is

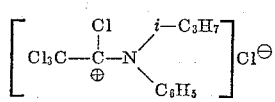

EXAMPLE VII

Employing the procedure of Example I but replacing N-methyl - N - phenyl - 1,2,2 - trichlorovinylamine with an equimolecular amount of N-pentamethylene - 1,2,2-trichlorovinylamine there is obtained N - ($\alpha,\alpha,\alpha$ - trichlorothionoacetyl)-piperidine. The intermediary iminium salt is

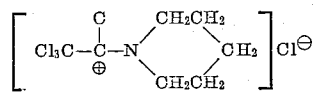

EXAMPLE VIII

Employing the procedure of Example I but replacing N-methyl - N - phenyl - 1,2,2 - trichlorovinylamine with an equimolecular amount of N,N - di-n-decyl - 1,2,2-trichlorovinylamine there is obtained N,N - di-n-decyl-$\alpha,\alpha,\alpha$-trichlorothionoacetamide. The intermediary iminium salt is

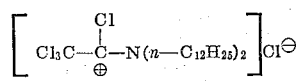

EXAMPLE IX

Employing the procedure of Example IV but replacing chlorine with an equimolecular amount of bromine there is obtained N,N - diethyl - $\alpha,\alpha$ - dichloro - $\alpha$ - bromothionoacetamide. The intermediary iminium salt is

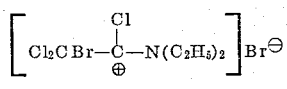

EXAMPLE X

Employing the procedure of Example IV but replacing N,N - diethyl - 1,2,2 - trichlorovinylamine with an equimolecular amount of N,N - di-n-propyl - 1,2,2 - trichlorovinylamine there is obtained N,N-di-n-propyl - $\alpha,\alpha,\alpha$-trichlorothionoacetamide. The intermediary iminium salt is

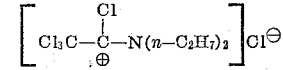

EXAMPLE XI

Employing the procedure of Example I but replacing N-methyl - N - phenyl - 1,2,2 - trichlorovinylamine with an equimolecular amount of N-ethyl - N - (m-tolyl)-1,2,2 - trichlorovinylamine there is obtained N-ethyl-N-(m-tolyl)-$\alpha,\alpha,\alpha$-trichlorothionoacetamide.

EXAMPLE XII

Employing the procedure of Example I but replacing N-methyl - N - phenyl - 1,2,2 - trichlorovinylamine with an equimolecular amount of N - methyl - N - (p-tert.-butylphenyl)-1,2,2 - trichlorovinylamine there is obtained N-methyl - N - (p-tert.-butylphenyl) - $\alpha,\alpha,\alpha$ - trichlorothionoacetamide.

EXAMPLE XIII

Employing the procedure of Example I but replacing chlorine with an equimolecular amount of bromine there is obtained N - methyl-N-phenyl-$\alpha,\alpha$-dichloro-$\alpha$-bromothionoacetamide. The intermediary iminium salt is

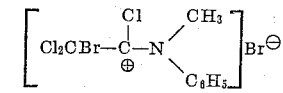

Other $\alpha,\alpha,\alpha$-trihalothionoacetamides of this invention include:

N-($\alpha,\alpha,\alpha$-trichlorothionoacetyl)-pyrrolidine
N-($\alpha,\alpha,\alpha$-trichlorothionoacetyl)-2-methylpyrrolidine
N-($\alpha,\alpha,\alpha$-trichlorothionoacetyl)-$\alpha$-pipecoline
N-($\alpha,\alpha,\alpha$-trichlorothionoacetyl)-$\beta$-pipecoline
N-($\alpha,\alpha,\alpha$-trichlorothionoacetyl)-$\alpha,\gamma$-lutidine
N-($\alpha,\alpha,\alpha$-trichlorothionoacetyl)-2,4-dimethylpyrrolidine
N-($\alpha,\alpha,\alpha$-trichlorothionoacetyl)-2-ethylpyrrolidine N-(α,α,α-trichlorothionoacetyl)-3-ethyl-4-methyl-
  piperidine
N-(α,α,α-trichlorothionoacetyl)-3-isobutylpiperidine
N-(α,α,α-trichlorothionoacetyl)-3-isobutyl-2-
  methylpiperidine
N-(α,α,α-trichlorothionoacetyl)-4-methylhexamethyl-
  eneimine
N-(α,α,α-trichlorothionoacetyl)-4-n-butylhexamethyl-
  eneimine
N-(α,α-dichloro-α-bromothionoacetyl)pyrrolidine
N-(α,α-dichloro-α-bromothionoacetyl)hexamethyl-
  eneimine
N-methyl-N-ethyl-α,α,α-trichlorothionoacetamide
N-methyl-N-isohexyl-α,α,α-trichlorothionoacetamide
N-ethyl-N-n-octyl-α,α,α-trichlorothionoacetamide
N-ethyl-N-n-decyl-α,α,α-trichlorothionoacetamide
N,N-di-p-tolyl-α,α,α-trichlorothionoacetamide
N,N-dicumenyl-α,α,α-trichlorothionoacetamide
N,N-dicymenyl-α,α,α-trichlorothionoacetamide
N-methyl-N-ethyl-α,α-dichloro-α-bromothiono-
  acetamide, etc.

The 1,2,2-trichlorovinylamine precursors are readily prepared by reacting an amide of the formula

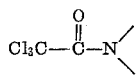

wherein N< has the aforedescribed significance with a phosphine of the formula R₃P or a phosphite of the formula (RO)₃P wherein each instance R is alkyl or aryl and to illustrate such is the following:

*Example A.—N,N-diethyl-1,2,2-trichlorovinylamine*

N,N-diethyl α,α,α-trichloroacetamide (218.5 g., 1 mole) is heated to 145°, with stirring. One mole (166.2 g.) of triethyl phosphite is then added to the amide at such a rate that the temperature does not exceed 150°. The addition required 1⅔ hours and the mixture is heated for an additional hour. During the addition period 6.05 g. of ethyl chloride evolved. An additional 10 g. was caught in a cold trap during the distillation of the 1,2,2-trichlorovinylamine. The total yield of ethyl chloride was 16.05 g. (0.249 mole) and therefore only 0.751 mole of amide was available for conversion to the 1,2,2-trichlorovinylamine. Distillation of the reaction mixture afforded 147.4 g. (96.8% of theory) of N,N-diethyl-1,2,2-trichlorovinylamine, B.P. 67–71° (6.2 mm. of Hg); $n_D^{25}$ 1.4779, based on the amount of ethyl chloride isolated and 72.6% of theory based on the amount of amide charged.

*Example B.—N,N-di-n-propyl-1,2,2-trichlorovinylamine*

The procedure of Example A is repeated except that 49.8 g. (0.3 mole) of triethylphosphite is added to 74 g. (0.3 mole) of N,N-di-n-propyl α,α,α-trichloroacetamide and 20.7 g. (33.4 percent of theory) of N,N-di-n-propyl-1,2,2-trichlorovinylamine is obtained.

*Example C.—N,N-dimethyl-1,2,2-trichlorovinylamine*

To 109.3 g. (0.5 mole) of N,N-dimethyl-α,α,α-trichloroacetamide there is added 101.0 g. (0.5 mole) of tributyl phosphine under a nitrogen atmosphere. The reaction temperature rose quickly to 55° C. By cooling the reaction mixture with ice water, addition was completed in 30 minutes at 55–60° C. The reaction mixture is then heated 1.5 hours at 55–60° after addition was completed. Distillation through a 15×150 mm. Vigreux column afforded 52.6 g. (60.3% of theory) of N,N-dimethyl-1,2,2-trichlorovinylamine, B.P. 65–66° (24 mm. Hg), $n_D^{25}$ 1.4948.

*Example D.—N,N-diphenyl-1,2,2-trichlorovinylamine*

To a solution consisting of 600 ml. of hexane and 68.6 g. (0.218 mole) of N,N-diphenyl-α,α,α-trichloroacetamide heated to 70°, there is added 200 ml. of hexane containing 78.7 g. (0.3 mole) of triphenylphosphine. The hexane-triphenylphosphine solution is warmed in order to maintain a homogeneous solution. The addition required one hour after which the reaction mixture is heated (70° C.) for two hours. Triphenylphosphine oxide began precipitating immediately after the addition of triphenylphosphine was started. After the heating period the reaction mixture was filtered through a coarse fritted glass funnel. The filter cake A is washed with ether and the washings added to the original filtrate. The ether-hexane filtrates are concentrated in vacuo to a solid-oil residue which is triturated several times with boiling petroleum ether (B.P. 38–48°). The solid B which remained is mixed with the above residue A and dissolved in methanol. Triphenylphosphine oxide M.P. 151–153°, 58.1 g. (69.6 percent of theory) is isolated from the methanolic solution by adding water.

A bright red oil (51.6 g.) is obtained after distilling the solvent in vacuo. There is obtained from this oil 35.7 g. (55.4 percent of theory) of N,N-diphenyl-1,2,2-trichlorovinylamine, M.P. 49–50°, on recrystallizing from methanol.

*Example E.—N-(1,2,2-trichlorovinyl)-piperidine*

In accordance with the procedure of Example A good yields of N-(1,2,2-trichlorovinyl)piperidine and tri-2-ethylhexyl phosphate are obtained upon reacting 125.6 g. (0.3 mole) of tri-2-ethylhexyl phosphite and 69.2 g. (0.3 mole) of N-(α,α,α-trichloroacetyl)piperidine.

*Example F.—N-methyl-N-phenyl-1,2,2-trichlorovinylamine*

A mixture of N-methyl-α,α,α-trichloroacetanilide (50.4 g., 0.20 mole), triphenylphosphine (52.4 g., 0.20 mole) and benzene (200 ml.) is heated at 85° for 2 hours. The benzene is evaporated in vacuo and distillation yields N-methyl-N-phenyl-1,2,2-trichlorovinylamine as a colorless liquid (28.3 g., 0.12 mole, 60%), B.P. 105° (0.5 mm.), $n_D^{25}$ 1.5859.

Other 1,2,2-trichlorovinylamine precursors of this invention include:

N-(1,2,2-trichlorovinyl)pyrrolidine
N-(1,2,2-trichlorovinyl)-2-methylpyrrolidine
N-(1,2,2-trichlorovinyl)piperidine
N-(1,2,2-trichlorovinyl)-α-pipecoline
N-(1,2,2-trichlorovinyl)-β-pipecoline
N-(1,2,2-trichlorovinyl)-2,4-dimethylpyrrolidine
N-(1,2,2-trichlorovinyl)hexamethyleneimine
N-(1,2,2-trichlorovinyl)-3-ethyl-4-methylpiperidine
N-(1,2,2-trichlorovinyl)-3-isobutylpiperidine
N-(1,2,2-trichlorovinyl)-3-isobutyl-2-methylpiperidine
N-(1,2,2-trichlorovinyl)-4-methylhexamethyleneimine
N-methyl-N-ethyl-1,2,2-trichlorovinylamine
N-methyl-N-isohexyl-1,2,2-trichlorovinylamine
N-methyl-N-(m-tolyl)-1,2,2-trichlorovinylamine
N-methyl-N-(p-tert.-butylphenyl)-1,2,2-trichloro-
  vinylamine
N,N-di-n-butyl-1,2,2-trichlorovinylamine
N,N-di-n-octyl-1,2,2-trichlorovinylamine
N,N-di-n-decyl-1,2,2-trichlorovinylamine
N-isopropyl-N-phenyl-1,2,2-trichlorovinylamine
N-isopropyl-N-n-decyl-1,2,2-trichlorovinylamine
N,N-di-p-tolyl-1,2,2-trichlorovinylamine
N,N-di-3,5-xylyl-1,2,2-trichlorovinylamine
N,N-dicumenyl-1,2,2-trichlorovinylamine
N,N-dicymenyl-1,2,2-trichlorovinylamine In view of the sensitivity of these 1,2,2-trichlorovinylamine precursors to water and moisture it is preferred that they prior to use be stored in solution or suspension in an anhydrous inert organic solvent or liquid. It is also preferred that the process of this invention be conducted in an anhydrous system or medium for most efficient operation.

The methods by which the α,α,α-trihalothionoacetamides of this invention are isolated will vary sightly with the reactants employed and the product produced. Further purification by selective solvent extraction or by absorptive agents such as activated carbon or clays can precede the removal of the inert organic liquid (or solvent) when the latter is employed. Additionally an inert organic solvent can be added to and in the purification by absorptive agents. However, in that the products are herbicidally active they are generally satisfactory for herbicidal purposes without further purification.

The α,α,α-trihalothionoacetamides of this invention are useful for selectively inhibiting the germination and preemergent growth of plants, particularly grasses, from seed in contact with soil and to illustrate their activity the following: Seeds of several different plants (itemized hereinafter) each representing a principal botanical species are planted in aluminum pans (9½" x 5¼" x 2¾"). A good grade of top soil treated with 0.05% of a resinous polyelectrolyte soil conditioner is compacted to a depth of ⅜" from the top of the pan. The grass seeds are scattered randomly over one-half of the soil surface and the broadleaf seeds are scattered randomly over the remaining one-half of the soil surface. The seeds are then covered with ⅜" of the prepared soil mixture and the pan levelled.

The levelled surface of the soil in the pan is then sprayed with 15 cc. of acetone containing N-methyl-N-phenyl-α,α,α-trichlorothionoacetamide dissolved therein at a rate of 25 pounds per acre.

After spraying the soil surface, the pan is placed in a sand bench and ½" of water added to the bench. The soil absorbs moisture through perforations in the bottom until the soil surface is about one-half moist, by which time the excess water in the sand bench is drained off. The remaining soil surface is moistened by capillary action.

Fourteen days after application of N-methyl-N-phenyl α,α,α-trichlorothionoacetamide the results are observed and recorded. The number of plants of each species which germinated and grew are counted and converted to a herbicidal rating by means of a fixed scale based on average percent germination. (Germination rates are established for all new seed lots and periodic checks run on old seed in current use.) The scale used is as follows:

HERBICIDAL RATING—CONVERSION SCALE

| Seed Lot, Percent Germination (Control) | Number of plants surviving | | | |
|---|---|---|---|---|
| | 3 | 2 | 1 | 0 |
| 100 | 0–5 | 6–10 | 11–15 | 16–20 |
| 90 | 0–5 | 6–9 | 10–13 | 14–20 |
| 80 | 0–4 | 5–8 | 9–12 | 13–20 |
| 70 | 0–4 | 5–7 | 8–11 | 12–20 |
| 60 | 0–3 | 4–6 | 7–9 | 10–20 |
| 50 | 0–3 | 4–5 | 6–8 | 9–20 |
| 40 | 0–2 | 3–4 | 5–6 | 7–20 |

The relative value of N-methyl-N-phenyl-α,α,α-trichlorothionoacetamide with respect to its herbicidal effect on each plant is indicated by a number as follows:

0 . . . . . . . No germination inhibition.
1 . . . . . . . Slight germination inhibition.
2 . . . . . . . Moderate germination inhibition.
3 . . . . . . . Severe germination inhibition.

EXTENT[1] OF GERMINATION INHIBITION

Plant:
  Morning glory _____ 1
  Wild oat _____ 3
  Brome grass _____ 3
  Rye grass _____ 3
  Radish _____ 0
  Sugar beet _____ 3
  Foxtail _____ 3
  Crab grass _____ 3
  Pigweed _____ 3
  Soybean _____ 1
  Wild buckwheat _____ 2
  Tomato _____ 1
  Sorghum _____ 1

[1] 3=severe; 2=moderate; 1=slight; 0=no.

From the foregoing evaluation data it is apparent that the α,α,α-trihalothionoacetamides of this invention are selective and effective preemergence herbicides. Valuable selective herbicidal effects will be observed by applications of small amounts, for example, as low as 0.1 lb. of active component per acre as well as high concentrations, for example, 100 lbs. per acre. The preferred range of application is from about 1 to about 15 lbs. per acre.

Selective herbicidal activity with respect to several genera of grasses is illustrated by the data in the foregoing table. Other evaluations conducted with respect to plants of different genera, which have different metabolisms and physical characteristics indicate little or no inhibition of growth. The botanical types, or genera, of grasses which are effectively controlled by means of the α,α,α-trihalothionoacetamides of this invention, embrace a large number of undesirable plants, or weeds, frequently found in vegetable crops. This invention, however, is not limited to removing grasses from broad leaf plants since the selective activity will be useful in removing weeds from corn, which belongs to a different genus of grass. Many other crops and particularly the broad leaved plants are inhibited by weeds of the crab grass genera, which can be effectively controlled by the practice of this invention. In some instances there are minor herbicidal effects on dicotyledonous plants, and therefore optimum results may depend to some extent on experience with respect to the activity of the particular α,α,α-trihalothionoacetamide on the vegetable crop to be treated.

It will be apparent that quite different effects can be obtained by modifying the method of use. For this reason an essential part of this invention is the formulation so as to permit a uniform predetermined application of herbicide to the surface or sub-surface of the soil or other growth media so as to produce the desired effect. By proper selection and proportioning of the various extending agents either liquid or solid formulations can be prepared, and so as to adapt the herbicide for achieving the desired result with any conventional device for treating the surface or sub-surface of the soil or other growth media.

Although the α,α,α-trihalothionoacetamides of this invention are useful per se in controlling the germination and preemergent growth of a wide variety of plants, it is preferable that they be supplied to the plant growing medium in a dispersed form in a suitable extending agent.

In the instant specification and appended claims it is to be understood that the term "dispersed" is used in its widest possible sense. When it is said that the α,α,α-trihalothionoacetamides of this invention are dispersed, it means that the particles of the α,α,α-trihalothionoacetamides of this invention may be molecular in size and held in true solution in a suitable organic solvent. It means further that the particles may be colloidal in size and distributed throughout a liquid phase in the form of suspensions or emulsions or in the form of particles held in suspension by wetting agents. The term "dispersed" also means that the particles may be mixed with and distributed throughout a solid carrier providing a mixture in particulate form, e.g., pellets, granules, powders, or dusts.

In the instant specification and appended claims it is to be understood that the expression "extending agent" includes any and all of those substances in which the α,α,α-trihalothionoacetamides of this invention are dispersed. It includes, therefore, the solvents of a true solution, the liquid phase of suspensions, or emulsions and the solid phase of particulate solids, e.g., pellets, granules, dusts and powders.

The exact concentration of the α,α,α-trihalothionoacetamides of this invention employed in combatting or controlling noxious vegetation can vary considerably provided the required dosage (i.e., herbicidal amount) thereof is supplied to the plant growing medium. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared herbicidal spray or particulate solid. In such a concentrate composition, the $\alpha,\alpha,\alpha$-trihalothionoacetamide generally will be present in a concentration of 5 to 95 percent by weight, the residue being any one or more of the well-known herbicidal adjuvants, such as the various surface active agents (e.g., detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the $\alpha,\alpha,\alpha$-trihalothionoacetamides of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g., those boiling almost entirely under 400° F. and having a flash point above about 80° F., particularly kerosene), mineral oils and the like.

The $\alpha,\alpha,\alpha$-trihalothionoacetamides of this invention are preferably supplied to the plant growing medium in the form of emulsions or suspensions. Emulsions or suspensions are prepared by dispersing the $\alpha,\alpha,\alpha$-trihalothionoacetamides of this invention either per se or in the form of an organic solution thereof in water with the aid of a water-soluble surfactant. The term "surfactant" as employed here and in the appended claims is used as in Volume II of Schwartz, Perry and Berch's "Surface Active Agents and Detergents" (1958 Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary active substances which may be anion-active (or anionic), cation-active (or cationic), or non-ionizing (or non-ionic) which are described in detail in Volumes I and II of Schwartz, Perry and Berch's "Surface Active Agents and Detergents," (1958 Interscience Publishers, Inc., New York) and also in the November 1947 issue of Chemical Industries (pages 811-824) in an article entitled "Synthetic Detergents," by John W. McCutcheon and also in the July, August, September and October, 1952 issues of Soap and Sanitary Chemicals under the title "Synthetic Detergents." The disclosures of these articles with respect to surfactants, i.e., the anion-active, cation-active and non-ionizing capillary active substances are incorporated in this specification by reference in order to avoid unnecessary enlargement of this specification. The preferred surfactants are the water-soluble anionic surface-active agents and the water-soluble non-ionic surface-active agents set forth in U.S. 2,846,398 (issued Aug. 5, 1958). In general it is preferred that a mixture of water-soluble anionic and water-soluble non-ionic surfactants be employed.

The $\alpha,\alpha,\alpha$-trihalothionoacetamides of this invention can be dispersed by suitable methods (e.g., tumbling or grinding) in solid extending agents either of organic or inorganic nature and supplied to the plant growing medium in particulate form. Such solid materials include for example, tricalcium phosphate, calcium carbonate, kaolin, bole, kieselguhr, talc, bentonite, fuller's earth, pyrrophillite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g., attapulgus clay. These mixtures can be used for herbicidal purposes in the dry form or by addition of water-soluble surfactants or wetting agents the dry particulate solids can be rendered wettable by water so as to obtain stable aqueous dispersions or suspensions suitable for use as sprays.

In all of the forms described above the dispersions can be provided ready for use in combatting noxious vegetation or they can be provided in a concentrated form suitable for mixing with or dispersing in other extending agents. As illustrative of a particularly useful concentrate is an intimate mixture of $\alpha,\alpha,\alpha$-trihalothionoacetamide of this invention with a water-soluble surfactant which lowers the surface tension of water in the weight proportions of 0.1 to 15 parts of surfactant with sufficient of the $\alpha,\alpha,\alpha$-trihalothionoacetamide of this invention to make 100 parts by weight. Such a concentrate is particularly adapted to be made into a spray for combatting various forms of noxious vegetation by the addition of water thereto. As illustrative of such a concentrate is an intimate mixture of 95 parts by weight of N-methyl-N-phenyl-$\alpha,\alpha,\alpha$-trichlorothionoacetamide and 5 parts by weight of a water-soluble non-ionic surfactant such as polyoxyethylene derivative of sorbitan monolaurate.

Another useful concentrate adapted to be made into a spray for combatting noxious vegetation is a solution (preferably as concentrated as possible) of an $\alpha,\alpha,\alpha$-trichlorothionoacetamide of this invention in an organic solvent therefor. The said liquid concentrate preferably contains dissolved therein a minor amount (e.g., 0.5 to 10 percent by weight of the new herbicidal agent) of a surfactant (or emulsifying agent), which surfactant is also water-soluble. As illustrative of such a concentrate is a solution of N-methyl-N-phenyl-$\alpha,\alpha,\alpha$-trichlorothionoacetamide in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 mols of ethylene oxide per mol of sorbitan mono-ester of alkylphenol.

In all of the various dispersions described hereinbefore for herbicidal purpose, the active ingredient can be one or more of the compounds of this invention. The compounds of this invention can also be advantageously employed in combination with other pesticides, including, for example, nematocides, bactericides, and insecticides. In this manner it is possible to obtain mixtures which are effective against a wide variety of pests and other forms of noxious life.

When operating in accordance with the present invention growth inhibiting amounts of the compound or a composition containing same are dispersed or distributed in any convenient fashion in soil or other growth media, for example by simply mixing with the soil or by applying to the surface of the soil and thereafter dragging or disking the soil to the desired depth, or by injection or drilling techniques whereby the $\alpha,\alpha,\alpha$-trichlorothionoacetamide of this invention is deposited beneath the surface of the soil, or by employment of a liquid carrier (solvent or non-solvent) to accomplish the penetration and impregnation. The application of the spray and dust compositions to the surface of the soil may be accomplished by conventional methods, e.g., with power dusters, boom or hand sprayers or spray dusters.

While hereinbefore the reaction product of chlorine or bromine and a 1,2,2-trichlorovinylamine has been assigned the iminium salt structural formula it is to be understood that the said reaction product can also be represented by the polar structural formula

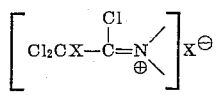

in which case it would be termed an amido chloride (note Zollinger et al., Helv. chim. Acta, vol. 42, p. 1659, 1959). Thus the iminium salts of respective Examples I to XIII can be termed.

N-methyl-N-phenyl-2,2,2-trichloroacetamido chloride
N,N-diphenyl-2,2,2-trichloroacetamido chloride
N-(hexamethylene)2,2,2-trichloroacetamido chloride
N,N-diethyl-2,2,2-trichloroacetamido chloride
N,N-dimethyl-2,2,2-trichloroacetamido chloride
N-isopropyl-N-phenyl-2,2,2-trichloroacetamido chloride
N-(pentamethylene)-2,2,2-trichloroacetamido chloride
N,N-di-n-decyl-2,2,2-trichloroacetamido chloride
N,N-diethyl-2,2-dichloro-2-bromoacetamido bromide
N,N-di-n-propyl-2,2,2-trichloroacetamido chloride
N-ethyl-N-(m-tolyl)-2,2,2-trichloroacetamido chloride
N-methyl-N-(p-tert.-butylphenyl)-2,2,2-trichloroacetamido chloride
N-methyl-N-phenyl-2,2-dichloro-2-bromoacetamido bromide While this invention has been described with respect to certain embodiments, it is to be understood that it is not so limited and that variations and modifications thereof obvious to those skilled in the art can be made without departing from the spirit and scope thereof.

We claim:
1. An iminium salt of the formula

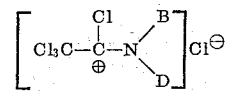

wherein B and D respectively have from 1 to 10 carbon atoms and are alkyl radicals.

References Cited

UNITED STATES PATENTS

| | | | |
|---|---|---|---|
| 2,587,957 | 3/1952 | Bauer et al. | 260—551 |
| 2,201,171 | 5/1940 | Hanford | 260—551 |
| 2,468,593 | 4/1949 | Dorman | 260—566 |
| 2,864,683 | 12/1958 | Hamm et al. | 71—2.7 |
| 3,153,670 | 10/1964 | Speziale et al. | 260—566 X |

OTHER REFERENCES

German Auslegeschrift 1,111,172, July 20, 1961 (3 pp. spec.).

Speziale et al.: J. Am. Chem. Soc., vol. 82, pp. 909–917 (1960).

Houben-Weyl: "Methoden der Organischen Chemie," 4th ed., Band VIII, "Saurstoffverbindungen III," pp. 672–673, Georg Thieme Verlag, Stuttgart, Germany (1952).

Pederson et al.: J. Am. Chem. Soc., vol. 79, pp. 1115 to 1118 (1957).

JOHN D. RANDOLPH, *Primary Examiner.*